United States Patent [19]

Wang

[11] Patent Number: 5,106,117
[45] Date of Patent: Apr. 21, 1992

[54] FOLDING GOLF CART

[76] Inventor: Lee M. Wang, No. 95, Chu Wei Wei, Chiao Nan Li, Yen Shui Chen, Tainan Hsien, Taiwan

[21] Appl. No.: 581,611

[22] Filed: Sep. 12, 1990

[51] Int. Cl.$^5$ .............................................. B62B 1/04
[52] U.S. Cl. ............................ 280/646; 280/47.315; 280/DIG. 6; 403/93; 403/95
[58] Field of Search ............... 280/DIG. 6, 646, 655, 280/655.1, 47.315, 47.371, 47.19, 642, 643, 648, 647; 403/93, 95, 96

[56] References Cited

U.S. PATENT DOCUMENTS

| | | | |
|---|---|---|---|
| 2,889,160 | 6/1959 | Nelson | 403/93 |
| 3,949,625 | 4/1976 | Bienert | 403/96 |
| 4,731,896 | 3/1988 | Latour | 403/93 |
| 4,784,401 | 11/1988 | Raguet | 280/DIG. 6 |
| 4,793,622 | 12/1988 | Sydlow | 280/646 |
| 4,887,835 | 12/1989 | Dallaire et al. | 280/DIG. 6 |
| 4,946,186 | 8/1990 | Cheng | 280/DIG. 6 |

FOREIGN PATENT DOCUMENTS 2528968 1/1976 Fed. Rep. of Germany ... 280/DIG. 6

Primary Examiner—David M. Mitchell
Attorney, Agent, or Firm—Browdy and Neimark

[57] ABSTRACT

An improvement for a folding gold cart, having three adjustable articulated joints connecting an upper pillar, a medium pillar and a lower pillar. The cart having a wheel bearer tilting from the two sides of the lower pillar to support the wheels, and a movable under-carriage and bracket to fix the golf club bag. The articulated joints can be adjusted to different angles to cope with the height and habit of the user, and fold the upper, medium and lower pillars in pairs. The articulated joints, along with the employment of convenient assembling and disassembling wheels overcome the shortcomings of conventional golf carts.

2 Claims, 5 Drawing Sheets

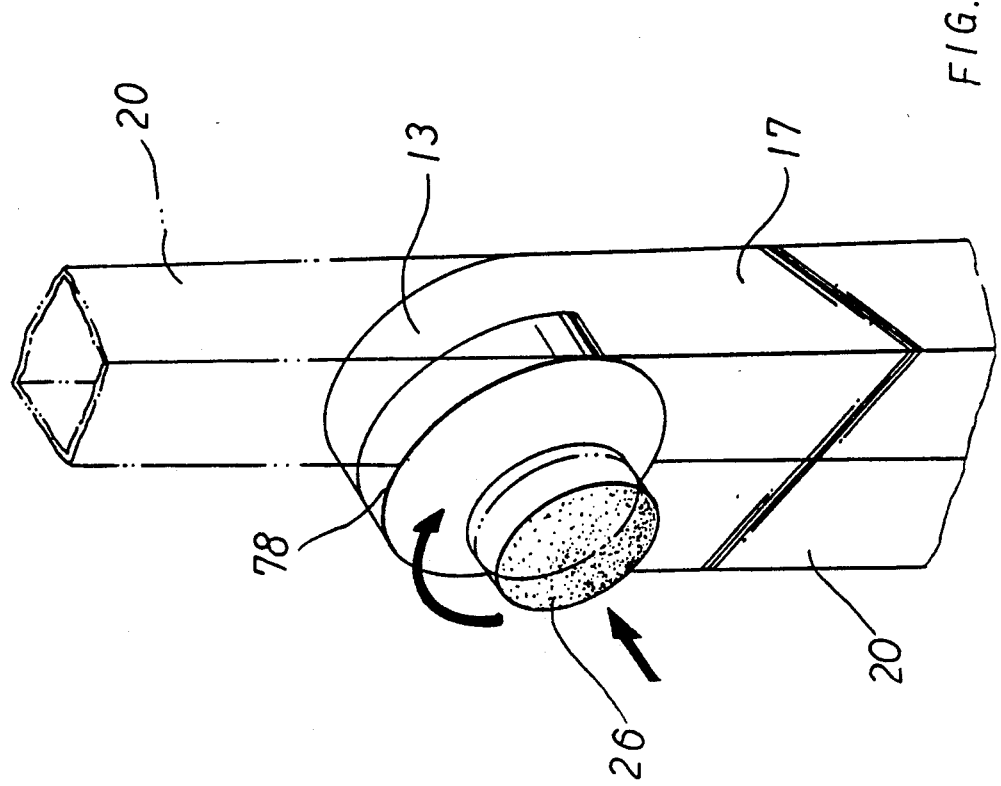
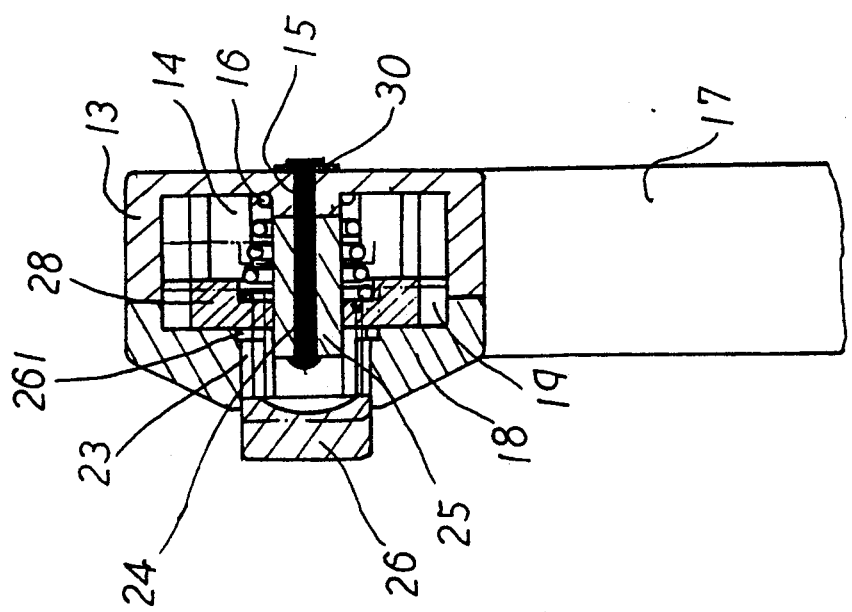
FIG. 5
FIG. 4

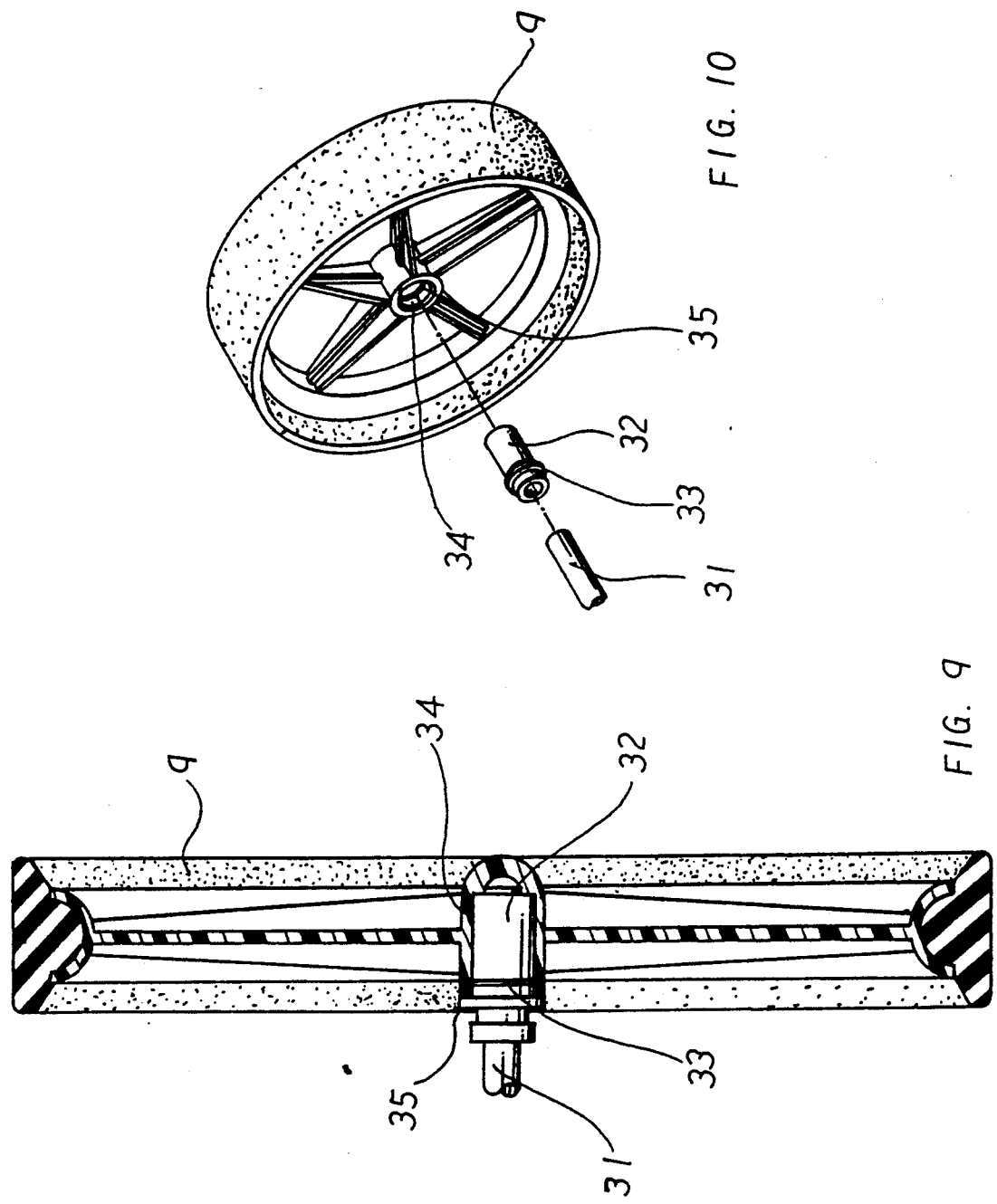

FOLDING GOLF CART

SUMMARY OF THE INVENTION

The present invention is directed to an improvement for a folding golf cart. The improved folding golf cart is provided with a plurality of novel adjustable articulated joints having a polygonal star shape groove, a stop block, a spring and a push button. The adjustable articulated joints permits the folding of the cart to meet different requirements. The folding cart also permits quick assemble or disassemble of the wheels by means of a snap groove and a flange on a wheel axle socket inside the wheel axle hole. The cart is practical, easy to operate and store.

While world commerce has increased, the pace of living has also turned faster gradually. This has increased the need for recreational activities such as golf to lessen the anxiety. However, it is not easy to carry golf club bags on large golf courses. Such large courses have made golf carts which carry golf club bags indispensable. Unfortunately, conventional golf carts have unadjustable heights which do not meet the different storages or size requirements of users. Further, the handle is also fixed and unable to be adjusted in accordance with the habit of the user. In addition, while some golf carts are foldable, the body of the cart is still too long, and takes too much space and is also inconvenient to carry. In order to improve the above shortcomings of conventional golf carts, the present invention is directed to a labour-saving, convenient and practical folding golf cart.

The primary purpose of the present invention is to provide an improved folding golf cart. This is accomplished by use of a novel adjustable articulated joint having a polygonal star shape groove, a stop block, a spring and a push button. A light touch of the push button permits adjustment of the cart to an appropriate size and angle in accordance with the height of the user or to have the cart folded. The cart is a labour-saving, easy to operate and practical improvement over prior art carts.

An other purpose of the present invention is to provide an improvement of the folding golf cart by means of an articulated joint which is adjustable and divides the cart frame into an upper pillar, a medium pillar and a lower pillar which is collapsible into a convenient to carry vehicle.

A further purpose of the present invention is to provide an improvement of the folding golf cart, in which a chuck groove on the wheel axle and a flange inside the hole of the wheel axle are mutually formed to allow the wheel of the cart to be quickly and easily assembled and disassembled.

DESCRIPTION OF THE DRAWINGS

A detailed description of the drawings showing the structure, functions and features of the improved folding golf cart of the present invention along with a preferred embodiment is given as follows:

FIG. 4 is the plant view of the assembly of the adjustable articulated joint of the present invention.

FIG. 5 is the external solid view of the adjustable articulated joint of the present invention.

FIG. 9 is the plan view of the assembly of the portion of the wheel of the present invention.

FIG. 10 is an exploded view of the portion of wheel of the present invention.

DETAILED DESCRIPTION OF THE PREFERRED EMBODIMENT

Figure 2:
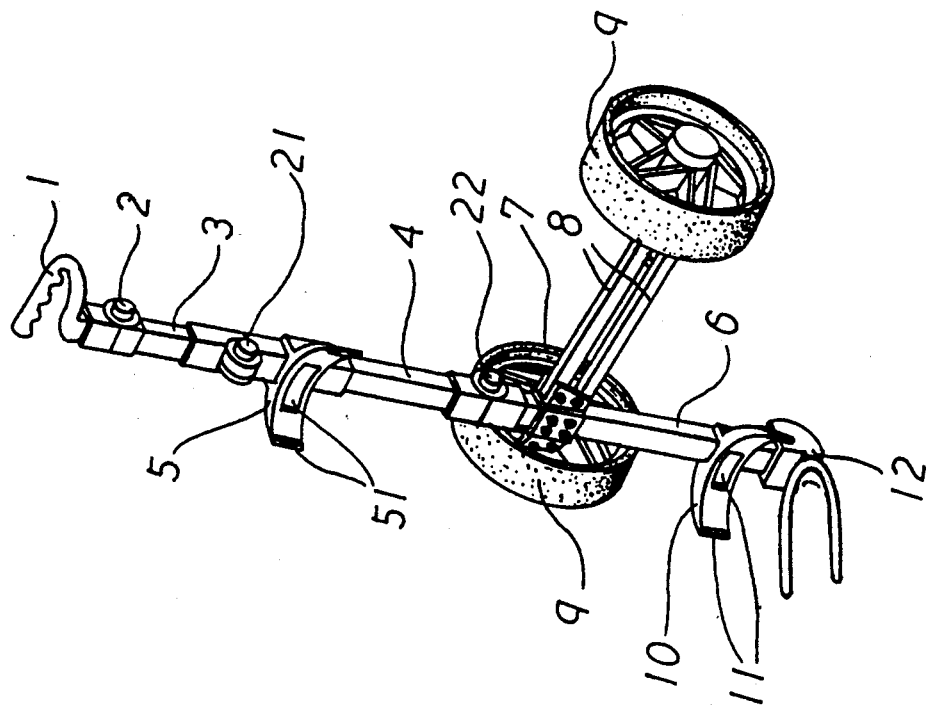
FIG. 2 is the preferred embodiment of the present invention.
Figure 1:
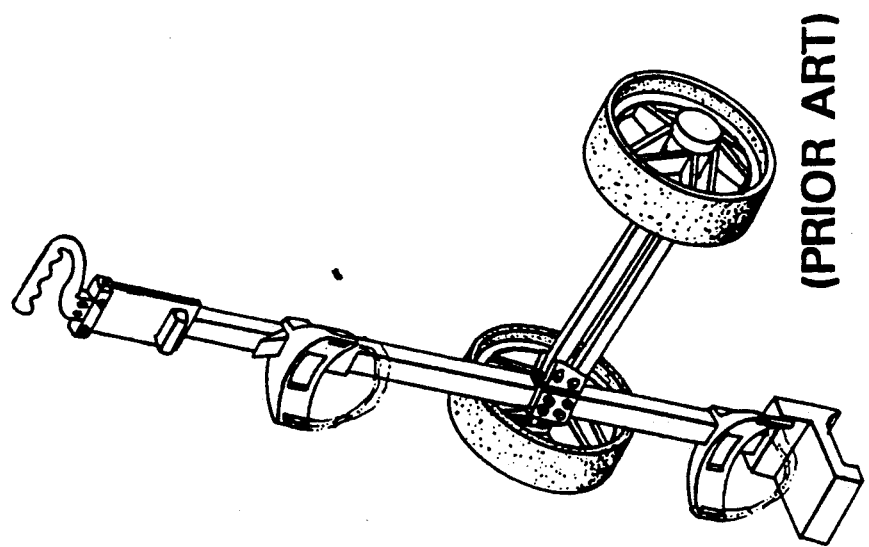
FIG. 1 is the external view of a prior art folding golf cart.

As shown in FIG. 2, the improvement of the folding golf cart of the present invention is directed to locating an adjustable articulated joint at three different points on the spine of the cart. These points are 2, between the arc handle 1 and the end of upper pillar 3, point 21, between the lower end of the upper pillar 3 and the upper end of medium pillar 4 and point 22, between the lower end of the medium pillar 4 and the upper end of lower pillar 6. Further, U-shaped connector 7 secured to and projecting back from the upper section of the lower pillar 6 connects each of two wheel bearers 8 on either side of the lower pillar 6. A wheel axle 31 to support a wheel 9 is mounted on the end of wheel bearer 8. Wheel bearers 8 are foldable to be parallel to the two sides of the lower pillar 6 by means of the four connecting shafts of the two wheel bearers 8 in a known manner. An upper bracket 5 in upward arc shape with a belt opening 51 is attached to the upper portion of the medium pillar 4. Further, there is a lower bracket 10 in forward arc shape with belt opening 11 at the end of the lower pillar 6, and there is an U-shape movable base 12 with riveted joint on the bottom of the lower pillar.

Figure 3:
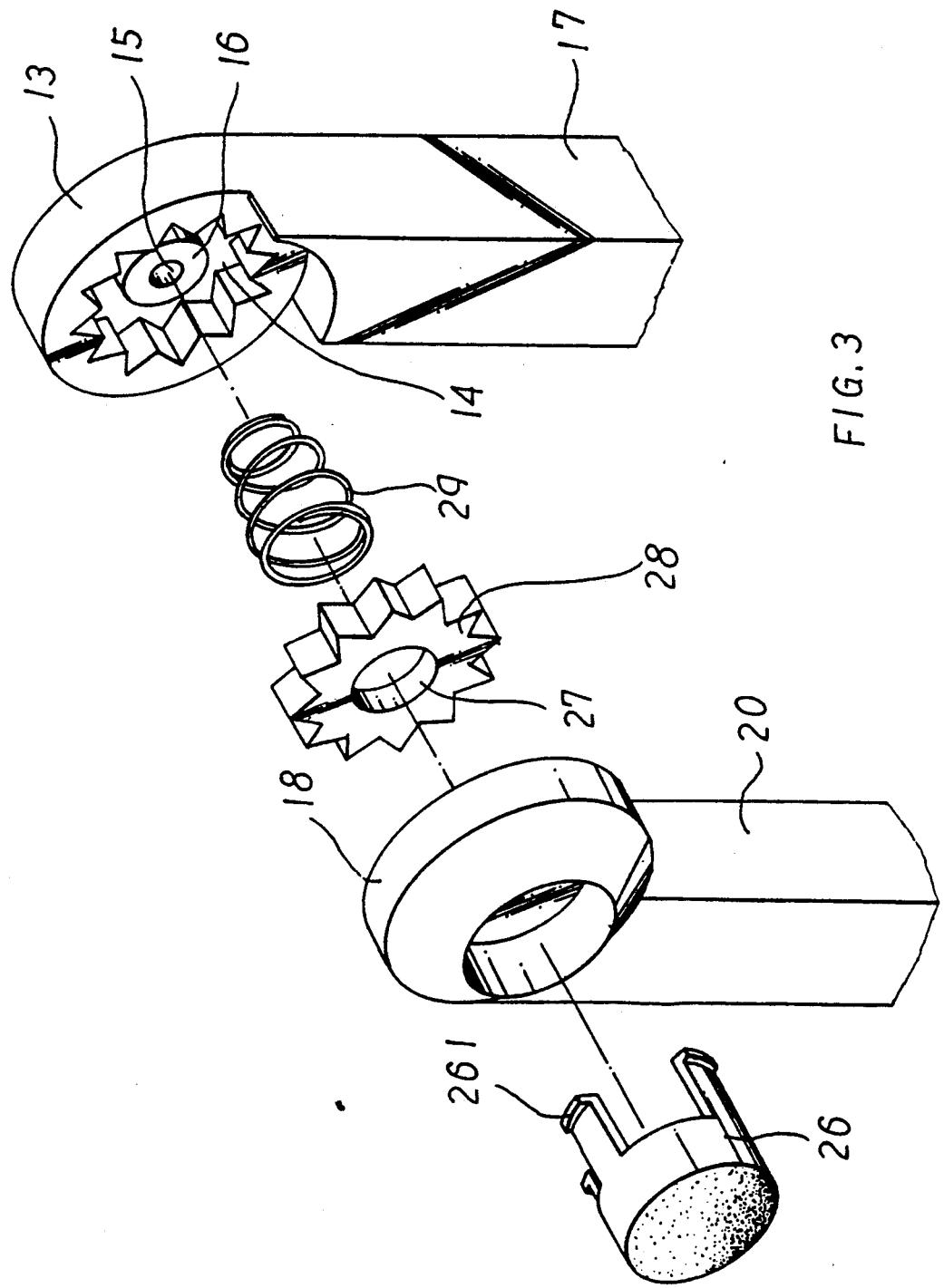
FIG. 3 is an exploded view of the articulated joint of the present invention.
Figures 6, 7, 8:
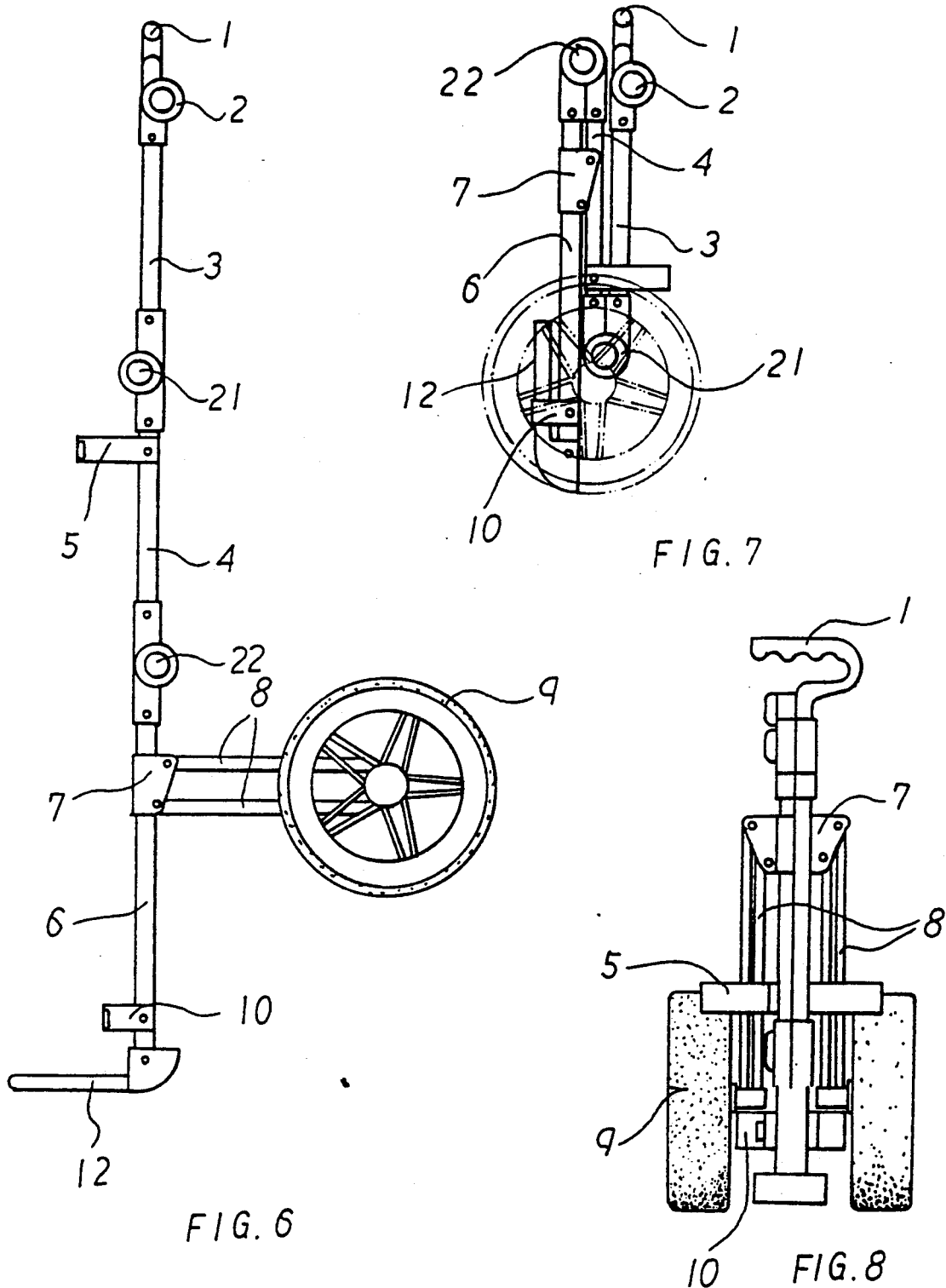
FIG. 6 is the lateral view of the preferred embodiment of the present invention.
FIG. 7 is the lateral view of the folding of the present invention.
FIG. 8 is the front view of the folding of the present invention.

The articulated joint including its adjustable feature in the improvement of the folding golf cart, is shown in FIGS. 3 through 5. The joint has polygonal star shape concave trough 14 inside the disk shape bottom case 13. There is a small cylinder 16 with a circular penetrating hole in the center. One fourth of the periphery of the disk at the bottom case 13 is connected with the post 17 and one half of post 17 protrudes past the disk. There is also a polygonal star shape concave trough 19 and a post 20 on the top 18 in a position corresponding to that of the bottom case. There is a circular concave trough 23 formed opposite the bottom wall of trough 19. Three penetrating holes connect the polygonal star shape concave trough 19 to trough 23 on the other side of the top case 18. There is cylinder 25 with a penetrating hole 24 in the center connected inside the polygonal star shape concave trough 19 on its bottom wall. A push button 26 with three legs which penetrate the three holes of the top case 18 and are buckled reversely in the polygonal star shape concave trough 19 via the flange 261 on the legs of the push button 26. There is a polygonal star shape stop block 28 with a circular hole 27 in the center which is penetrated by the cylinder 15 which is encased with a spiral spring 29. The top case 18 and bottom case 13 are joined by rivet 30. When the push button 26 is pressed downwards, the stop block 28 will depart from the top case 18 and permit the turning of the top case and the bottom case. When the push button 26 is biased back by spring 29, the stop block returns into the midst of the top case 18 and the bottom case 13 is fixed at the adjusted angle or to attain the function of relative folding. In addition, as shown in FIGS. 9 and 10, a wheel axle cylindrical socket 32 with flange 33 is encased on the fixed wheel axle 31 of the present invention, and there is a chuck groove 35 inside the axle hole 34 of the wheel allowing the letting in of the chuck groove 35 and the flange 33 allowing quick assembling and disassembling of the wheel.

To sum up, with the adjustable articulated joint and easy to assemble and disassemble wheel, provides the adjustment of most fittable angle or folding of the car by a light pressing of the push button in accordance with the height and habit of the user and is convenient to carry due to easy assembling and disassembling of the wheel and taking less space.

I claim:

1. An improved folding golf cart comprising;
   an adjustable articulated joint,
   a handle connected by a first said adjustable articulated joint to a top end of an upper pillar,
   a bottom end of said upper pillar connected by a second said adjustable articulated joint to a top end of a medium pillar,
   a bottom end of said medium pillar connected by a third said adjustable articulated joint to a top end of a lower pillar,
   wheel bearers rotatably extended from two sides of said lower pillar,
   said wheel bearers holding at least two releasable wheels,
   a moveable base and brackets to fix a golf club bag;
   each said adjustable articulated joint comprising;
   a disk shaped bottom case,
   a polygonal star shaped concave trough inside said disk shaped bottom case,
   means on said bottom case for engaging said pillars or said handle,
   a disk shaped top case respectively having a diameter and a polygonal star shaped concave trough inside said top case corresponding to a diameter and said polygonal star shaped concave trough inside said bottom case;
   means on said top case for engaging said pillars or said handle,
   a circular concave trough on an outer side of said top case with three holes communicating with the polygonal star shaped trough of said top case,
   a circular push button having three legs engaged in said three holes of said top case,
   said three legs held within said polygonal star shaped trough inside said top case by flanges at ends of said three legs,
   a spring biased polygonal star shaped stop block having a center hole slideably engaged in said corresponding polygonal star shaped trough of said top case and said bottom case,
   a bolt coaxially joining said top case, said bottom case and said stop block,
   wherein, when said push button is pressed said spring biased stop block slides into said bottom case permitting rotation of said top case to a selected position and when said push button is released said top case is fixed on said bottom case in said selected position, thereby permitting angular adjustment of said pillars and said handle connected to said first, second and third said adjustable articulated joint.

2. An improved folding golf cart in accordance with claim 1, wherein each of said at least two releasable wheels comprises;
   a cylindrical axle socket having a flange releasably inserted into a chuck groove in an axle hole of said each of said at least two releasable wheels.

* * * * *